United States Patent
Peros et al.

(10) Patent No.: US 10,009,224 B1
(45) Date of Patent: Jun. 26, 2018

(54) COMPUTER SYSTEM MANAGEMENT IN COMPLIANCE WITH BEST PRACTICES

(71) Applicant: EMC Corporation, Hopkinton, MA (US)

(72) Inventors: Roko Peros, Raleigh, NC (US); Mohamed A. Elayouty, Cary, NC (US); Richard A. Hooker, Milford, MA (US); John S. Currie, Chapel Hill, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 391 days.

(21) Appl. No.: 13/931,772

(22) Filed: Jun. 28, 2013

(51) Int. Cl.
*G06F 15/177* (2006.01)
*H04L 12/24* (2006.01)

(52) U.S. Cl.
CPC ................................ *H04L 41/0813* (2013.01)

(58) Field of Classification Search
CPC .................................................... H04W 24/02
See application file for complete search history.

(56) References Cited

U.S. PATENT DOCUMENTS

| | | | |
|---|---|---|---|
| 8,032,557 B1 | 10/2011 | Vijendra et al. | |
| 8,112,451 B1 | 2/2012 | Graham et al. | |
| 8,244,777 B1 | 8/2012 | Vijendra et al. | |
| 8,285,827 B1 | 10/2012 | Reiner et al. | |
| 8,452,856 B1* | 5/2013 | Lent | G06F 3/0647 709/219 |
| 8,782,784 B1 | 7/2014 | Bruskin | |
| 8,813,240 B1* | 8/2014 | Northup | G06F 21/554 726/22 |
| 8,949,194 B1 | 2/2015 | Mehlum et al. | |
| 8,972,361 B1 | 3/2015 | Reiner et al. | |
| 2007/0130264 A1* | 6/2007 | Walker | 709/206 |
| 2012/0257603 A1* | 10/2012 | Mercier | 370/338 |
| 2013/0036227 A1* | 2/2013 | Stevens, III | 709/226 |
| 2013/0185718 A1* | 7/2013 | S M | G06F 9/45558 718/1 |
| 2014/0137110 A1* | 5/2014 | Engle | G06F 9/5022 718/1 |

* cited by examiner

*Primary Examiner* — Michael A Keller
(74) *Attorney, Agent, or Firm* — BainwoodHuang

(57) ABSTRACT

Described are methods, systems, and apparatus, including computer program products for maintaining computer systems in compliance with best practices. A configuration data set is received specifying a plurality of operational parameters, and, for each operational parameter, a target setting for the operational parameter. For each operational parameter of the plurality of operational parameters: a computer system is queried for a current setting of the operational parameter on the computer system; it is determined whether the current setting of the operational parameter complies with the target setting for the operational parameter; and a command is sent to the computer system to change the current setting of the operational parameter on the computer system to conform with the target setting for the operational parameter.

21 Claims, 3 Drawing Sheets

| System | Compliance Status | Primary Datastore Type | Operating System |
|---|---|---|---|
| + esx_host_1 | Med (Fix) | | ESX |
| |_vm_exchange | High | iSCSI | Windows |
| |_vm_oracle | High | Fiber Channel | Solaris |
| |_vm_intranet | Med (Fix) | NFS | Linux |
| + esx_host_2 | Low | | ESX |
| |_vm_sharepoint | Low | iSCSI | Windows |
| |_vm_sap | ? | Fiber Channel | Unknown |

COMPUTER SYSTEM MANAGEMENT IN COMPLIANCE WITH BEST PRACTICES

FIELD OF THE INVENTION

The present invention relates generally to computer system management and, more specifically, to maintaining computer systems in compliance with best practices.

BACKGROUND

Large amounts of best practices and/or solutions data is currently captured in human readable documents. In some cases, leveraging such data requires manual implementation (e.g., requiring system administrators to read the best practices documents and manually adjust computer systems). Such manual implementation can require time, causing delayed implementation of current best practices. In some cases, delay in implementing best practice can lead to increased computer system downtime. Manually maintaining systems in compliance best practices can pose other challenges. System administrators might not be aware of updated best practices. System administrators might also not be alerted to unapplied best practices or when systems drift out of compliance with best practices.

SUMMARY OF THE INVENTION

Accordingly, there is a need for maintaining computer systems in compliance with best practices. The technology described herein can utilize systematically described best practices and deploy and/or implement the best practices on computer systems via a management module. The technology can check the compliance of computer system operating parameters with, e.g., best practices, to improve computer system performance, reliability, capacity, etc. The technology can monitor computer systems for compliance with best practices and alert administrators and/or bring computer systems into compliance. The technology can check remote sources of the current best practices and apply the current best practices to computer systems.

In one aspect, there is a method performed by a compliance module. The method can include receiving, by the compliance module, a configuration data set specifying a plurality of operational parameters, and, for each operational parameter, a target setting for the operational parameter. The method can include for each operational parameter of the plurality of operational parameters: querying, by the compliance module, a computer system for a current setting of the operational parameter on the computer system; determining, by the compliance module, whether the current setting of the operational parameter complies with the target setting for the operational parameter; and sending, by the compliance module, to the computer system a command to change the current setting of the operational parameter on the computer system to conform with the target setting for the operational parameter.

In some embodiments, the method can include retrieving, by the compliance module, the configuration data set from a remote source. In some embodiments, the method can include requesting, by the compliance module, an updated configuration data set from a remote source. In some embodiments, the method can include receiving, by the compliance module, the updated configuration data set specifying a second plurality of operational parameters, and, for each operational parameter, a second target setting for the operational parameter. In some embodiments, the method can include for each operational parameter of the second plurality of operational parameters: querying, by the compliance module, the computer system for a second current setting of the operational parameter on the computer system; determining, by the compliance module, whether the second current setting of the operational parameter complies with the second target setting for the operational parameter; and sending, by the compliance module, to the computer system a second command to change the second current setting of the operational parameter on the computer system to conform with the second target setting for the operational parameter.

In some embodiments, the target setting for the operational parameter is a single value; and determining whether the current setting of the operational parameter complies with the target setting for the operational parameter includes determining whether the current setting of the operational parameter is equal to the single value. In some embodiments, the target setting for the operational parameter is a range of values; and determining whether the current setting of the operational parameter complies with the target setting for the operational parameter includes determining whether the current setting of the operational parameter is within the range of values.

In some embodiments, the method can include selecting, by the compliance module, the configuration data set from a plurality of configuration data sets based on one or more computer system deployment characteristics. In some embodiments, the method can include providing, by the compliance module, display data indicating whether the current setting of the operational parameter complies with the target setting for the operational parameter.

In another aspect, there is a computer program product, tangibly embodied in a non-transitory computer readable storage medium, including instructions being operable to cause one or more data processing apparatus to: receive a configuration data set specifying a plurality of operational parameters, and, for each operational parameter, a target setting for the operational parameter; for each operational parameter of the plurality of operational parameters: query a computer system for a current setting of the operational parameter on the computer system; determine whether the current setting of the operational parameter complies with the target setting for the operational parameter; and send to the computer system a command to change the current setting of the operational parameter on the computer system to conform with the target setting for the operational parameter.

In some embodiments, the computer program product can include instructions being operable to cause the one or more data processing apparatus to retrieve the configuration data set from a remote source. In some embodiments, the computer program product can include instructions being operable to cause the one or more data processing apparatus to: request an updated configuration data set from a remote source; receive the updated configuration data set specifying a second plurality of operational parameters, and, for each operational parameter, a second target setting for the operational parameter; for each operational parameter of the second plurality of operational parameters: query the computer system for a second current setting of the operational parameter on the computer system; determine whether the second current setting of the operational parameter complies with the second target setting for the operational parameter; and send to the computer system a second command to change the second current setting of the operational parameter on the computer system to conform with the second target setting for the operational parameter.

In some embodiments, the target setting for the operational parameter is a single value; and the instructions being operable to cause the one or more data processing apparatus to determine whether the current setting of the operational parameter complies with the target setting for the operational parameter include instructions being operable to cause the one or more data processing apparatus to determine whether the current setting of the operational parameter is equal to the single value.

In some embodiments, the target setting for the operational parameter is a range of values; and the instructions being operable to cause the one or more data processing apparatus to determine whether the current setting of the operational parameter complies with the target setting for the operational parameter include instructions being operable to cause the one or more data processing apparatus to determine whether the current setting of the operational parameter is within the range of values.

In some embodiments, the computer program product includes instructions being operable to cause the one or more data processing apparatus to select the configuration data set from a plurality of configuration data sets based on one or more computer system deployment characteristics.

In some embodiments, the computer program product includes instructions being operable to cause the one or more data processing apparatus to provide display data indicating whether the current setting of the operational parameter complies with the target setting for the operational parameter.

In another aspect, there is a system. The system can include a compliance module configured to: receive a configuration data set specifying a plurality of operational parameters, and, for each operational parameter, a target setting for the operational parameter; for each operational parameter of the plurality of operational parameters: query a computer system for a current setting of the operational parameter on the computer system; determine whether the current setting of the operational parameter complies with the target setting for the operational parameter; and send to the computer system a command to change the current setting of the operational parameter on the computer system to conform with the target setting for the operational parameter.

In some embodiments, the compliance module is configured to retrieve the configuration data set from a remote source. In some embodiments, the compliance module is configured to: request an updated configuration data set from a remote source; receive the updated configuration data set specifying a second plurality of operational parameters, and, for each operational parameter, a second target setting for the operational parameter; for each operational parameter of the second plurality of operational parameters: query the computer system for a second current setting of the operational parameter on the computer system; determine whether the second current setting of the operational parameter complies with the second target setting for the operational parameter; and send to the computer system a second command to change the second current setting of the operational parameter on the computer system to conform with the second target setting for the operational parameter.

In some embodiments, the target setting for the operational parameter is a single value; and the compliance module is configured to determine whether the current setting of the operational parameter complies with the target setting for the operational parameter by determining whether the current setting of the operational parameter is equal to the single value. In some embodiments, the target setting for the operational parameter is a range of values; and wherein the compliance module is configured to determine whether the current setting of the operational parameter complies with the target setting for the operational parameter by determining whether the current setting of the operational parameter is within the range of values. In some embodiments, the compliance module is configured to provide display data indicating whether the current setting of the operational parameter complies with the target setting for the operational parameter.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which:

FIG. 2 depicts a screen displaying display data in accordance with the technology.

DETAILED DESCRIPTION

As an exemplary application, the technology can be used to deploy and/or maintain computer systems, such as virtual machine hosts, virtual machines, and/or connected storage systems. A compliance module (e.g., a computer system running software implementing the technology) can receive a configuration data set (e.g., best practices data) in the form of a Solution Description Language (SDL) document. The configuration data set can include target settings for operational parameters. For example, the configuration data set can include a target setting for the NFS timeout parameter on the virtual machines. The compliance module can connect to the virtual machines, check the current NFS timeout parameter for each virtual machine, and determine if the current value of the NFS timeout parameter differs from the target value specified in the configuration set. In some applications, the configuration module can send a command to a computer system to change the NFS timeout parameter for each virtual machine, if the current value of the NFS timeout parameter differs from the target value specified in the configuration set. In some applications, the configuration module can display and/or provide display data indicating when the current value of the NFS timeout parameter complies with the target value specified in the configuration set and/or when the current value of the NFS timeout parameter does not comply with the target value specified in the configuration set.

In some applications, the technology can include the compliance module checking a remote repository for updated configuration data sets (e.g., updated best practices), retrieving the updated configuration data sets, and implementing the updated best practices on computer systems. In some embodiments, the technology can proactively monitor and alert computer system administrators when computer systems do not comply with best practices.

Figure 1:
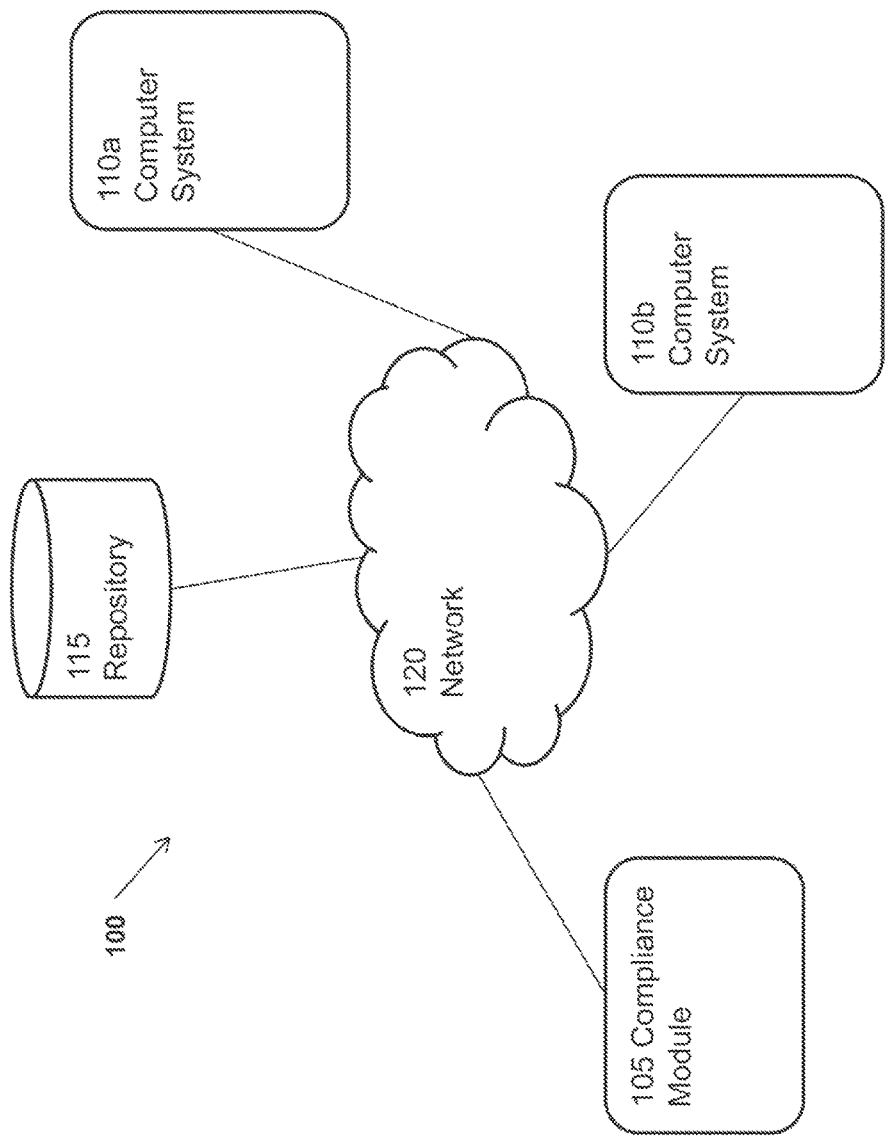
FIG. 1 depicts a system in accordance with the technology.

FIG. 1 depicts system 100 in accordance with the technology. System 100 includes compliance module 105, computer systems 110, and repository 115. In system 100, compliance module 105, computer systems 110, and repository 115 can be in data communication with each other via network 120. Compliance module 105, computer systems 110, and repository 115 can each be any computer system comprising one or more computing devices. It should be appreciated that system 100 is an exemplary system in accordance with the technology, and other configurations are contemplated. For example, the compliance module can be a software module running on a computer system or as a virtual machine and/or appliance on any computing device connected to the network. The repository can be a software module running on a computing device or a file on a back-end server.

FIG. 2 depicts screen 200 displaying display data in accordance with the technology. Screen 200 displays whether one or more computer systems are in compliance with best practices (e.g., whether operational parameters on the one or more computer systems comply with target values for the operational parameters specified in a configuration data set). For example, entry 205 indicates that system "vm_exchange" has "high" compliance status. Entry 210 indicates that system "vm_sharepoint" has low compliance status. In some embodiments, "high" compliance status can indicate the system complies with greater than a threshold of the target values for the operational parameters (e.g., greater than 75%). In some embodiments, "low" compliance status can indicate the system complies with less than a threshold of the target values for the operational parameters (e.g., less than 25%).

Figure 3:
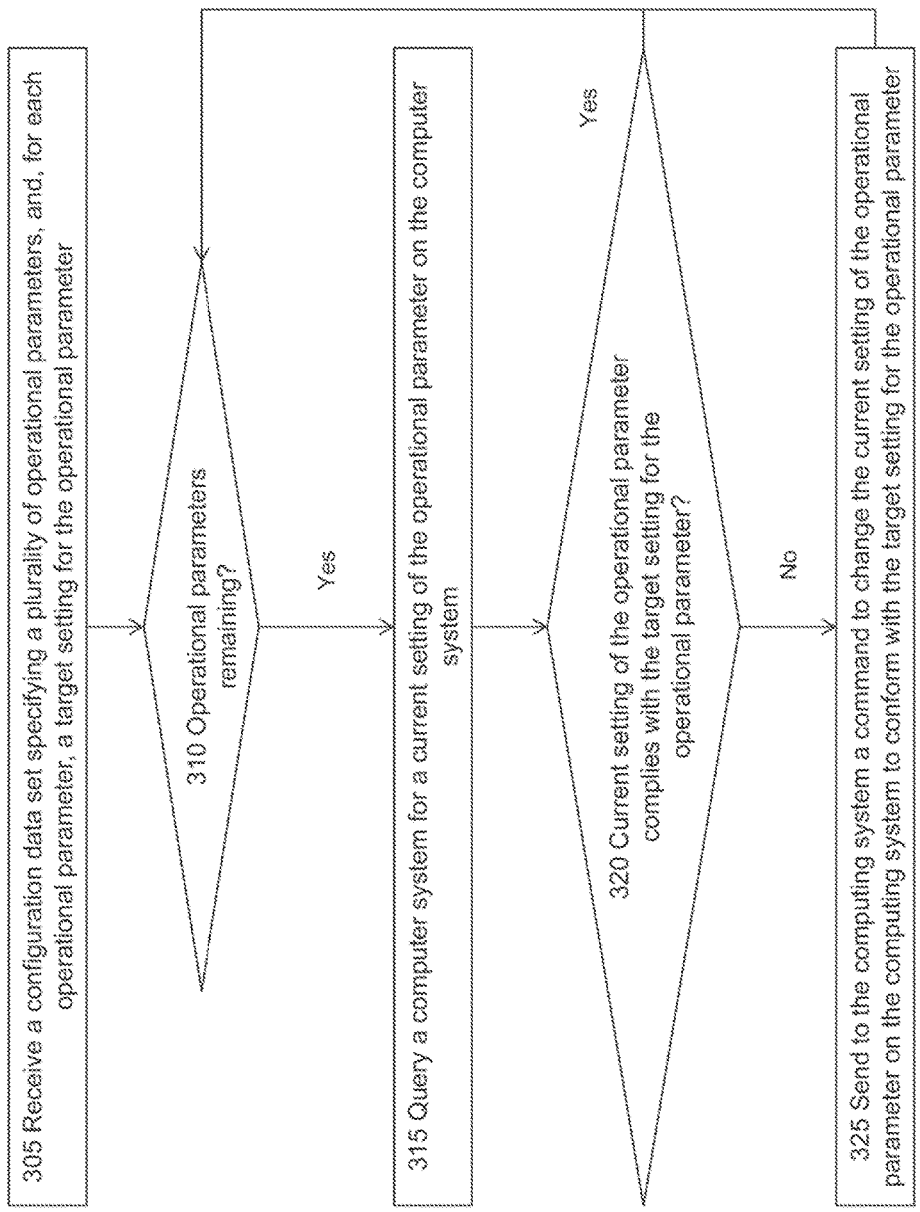
FIG. 3 is a flow chart depicting a method performed by a compliance module in accordance with the technology.

FIG. 3 is a flow chart depicting a method performed by a compliance module in accordance with the technology. The method can be executed by, e.g., compliance module 105. At step 305, the compliance module receives a configuration data set specifying a plurality of operational parameters, and, for each operational parameter, a target setting for the operational parameter. In some embodiments, the configuration data set can be in an SDL specifying the target for each operational parameter. Exemplary operational parameters can include Network File System (NFS) timeout, Host Bus Adapter (HBA) timeout, other NFS settings, iSCSI settings, multi-path network settings, etc. In some embodiments, the compliance module can retrieve a configuration data set from a remote source (e.g., repository 115). For example, the repository can be operated by the manufacturer of the computer systems and provide best practices data specified in the SDL. In some embodiments, the compliance module can select the configuration data set from a plurality of configuration data sets based on one or more computer system deployment characteristics. For example, the configuration data set can be selected based on the number of computer systems, the applications run by the computer systems, etc.

At step 310, the compliance module determines whether operational parameters remain to be processed, and if so, the method proceeds to step 315. At step 315, the compliance module queries a computer system for a current setting of the operational parameter on the computer system. For example, compliance module 105 can query system 110a and/or 110b for the NFS timeout parameter using APIs implemented on system 110a and/or system 110b.

At step 320, the compliance module determines whether the current setting of the operational parameter complies with the target setting for the operational parameter. For example, compliance module 105 can determine whether the NFS timeout parameter on computer system 110a complies with the target value in the configuration data set. In some embodiments, the target setting for the operational parameter can be a single value; and the compliance module can determine whether the current setting of the operational parameter complies with the target setting for the operational parameter by determining whether the current setting of the operational parameter is equal to the single value. In some embodiments, the target setting for the operational parameter is a range of values; and the compliance module can determine whether the current setting of the operational parameter complies with the target setting for the operational parameter by determining whether the current setting of the operational parameter is within the range of values. In some embodiments, the target setting for the operational parameter is an equation; and the compliance module can determine whether the current setting of the operational parameter complies with the target setting for the operational parameter by computing a result of the equation and comparing the result to the current setting of the operational parameter. For example, the equation can take as parameters one or more characteristics of the computer system in order to calculate a value or range of values for comparison to the current setting of the operational parameter. If the current setting complies with the target setting, the method proceeds to step 310 to process any remaining operational parameters specified in the configuration data set. If the current setting does not comply with the target setting, the method proceeds to step 325.

At step 325, the compliance module sends to the computer system a command to change the current setting of the operational parameter on the computer system to conform with the target setting for the operational parameter. For example, the compliance module can send a command to computer system 110a to set the NFS timeout parameter. In some embodiments, the command complies with an API implemented on system 110a. The method proceeds to step 310 to process any remaining operational parameters specified in the configuration data set. In some embodiments, the compliance module can provide an alert to a system administrator, and the system administrator can send one or more commands to change the current setting of the operational parameter on the computer system to conform with the target setting for the operational parameter.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computer system that includes a back-end component. The back-end component can, for example, be a data server, a middleware component, and/or an application server. The above described techniques can be implemented in a distributed computer system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computer system that includes any combination of such back-end, middleware, or front-end components.

The components of a computer system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Commnunications (GSM) protocol, Universal Mobile Telecommunications System (UMTS), 3GPP Long Term Evolution (LTE) and/or other communication protocols.

Devices of a computer system can include, for example, a computer, virtual machine running on a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft) Internet Explorer) available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. In a system comprising a compliance computer system communicably coupled to a monitored computer system operative to perform a plurality of operational functions, the compliance computer system including a processor, a method performed by the processor executing a computer program out of a memory, comprising:

receiving, at the processor, a configuration data set specifying a plurality of operational parameters corresponding to the plurality of operational functions, respectively, and, for each operational parameter, a target setting for the operational parameter, the plurality of operational parameters including one or more of a Network File System (NFS) timeout, a Host Bus Adapter (HBA) timeout, one or more specified NFS settings, one or more specified Internet Small Computer Systems Interface (iSCSI) settings, and one or more specified multi-path network settings, the plurality of operational parameters to be employed by the monitored computer system while performing the respective operational functions;

determining, by the processor, a first number of the plurality of operational parameters that comply with at least some target settings for the respective operational parameters, the first number being less than a predetermined threshold number of the target settings;

determining, by the processor, a difference number being a difference between the predetermined threshold number of the target settings and the first number of the plurality of operational parameters, the difference number of the plurality of operational parameters failing to comply with any of the target settings;

for each respective operational parameter among the difference number of the plurality of operational parameters that fail to comply with any of the target settings:

querying, by the processor, the monitored computer system for a current setting of the respective operational parameter on the monitored computer system; and sending, by the processor to the monitored computer system, a command to change the current setting of the respective operational parameter on the monitored computer system to conform with the target setting for the respective operational parameter; and monitoring, by the processor, a plurality of current settings for the plurality of operational parameters, respectively, for compliance with the target settings to assure that the plurality of operational parameters comply with at least the predetermined threshold number of the target settings.

2. The method of claim 1, wherein the compliance computer system, the monitored computer system, and a remote source are communicably coupled to one another via a network, and wherein the method performed by the processor executing the computer program out of the memory further comprises:

retrieving, by the processor over the network, the configuration data set from the remote source.

3. The method of claim 1, further comprising:
requesting, by the processor, an updated configuration data set from a remote source;

receiving, by the processor, the updated configuration data set specifying a second plurality of operational parameters corresponding to the plurality of operational functions, respectively, and, for each operational parameter, a second target setting for the operational parameter, the second plurality of operational parameters to be employed by the monitored computer system while performing the respective operational functions; and for each operational parameter of the second plurality of operational parameters:

querying, by the processor, the monitored computer system for a second current setting of the operational parameter on the monitored computer system;

determining, by the processor, whether the second current setting of the operational parameter complies with the second target setting for the operational parameter; and sending, by the processor, to the monitored computer system, a second command to change the second current setting of the operational parameter on the monitored computer system to conform with the second target setting for the operational parameter.

4. The method of claim 1, wherein the target setting for the operational parameter comprises a single value; and
wherein determining whether the current setting of the operational parameter complies with the target setting for the operational parameter comprises determining whether the current setting of the operational parameter is equal to the single value.

5. The method of claim 1, wherein the target setting for the operational parameter is a range of values; and
wherein determining whether the current setting of the operational parameter complies with the target setting for the operational parameter comprises determining whether the current setting of the operational parameter is within the range of values.

6. The method of claim 1, further comprising selecting, by the processor, the configuration data set from a plurality of configuration data sets based on one or more computer system deployment characteristics.

7. The method of claim 1, further comprising providing, by the processor, display data indicating whether the current setting of the operational parameter complies with the target setting for the operational parameter.

8. A computer program product, tangibly embodied in a non-transitory computer readable storage medium, including instructions operable to cause one or more data processing apparatus to:

receive a configuration data set specifying a plurality of operational parameters corresponding to a plurality of operational functions, respectively, and, for each operational parameter, a target setting for the operational parameter, the plurality of operational parameters including one or more of a Network File System (NFS) timeout, a Host Bus Adapter (HBA) timeout, one or more specified NFS settings, one or more specified Internet Small Computer Systems Interface (iSCSI) settings, and one or more specified multi-path network settings, the plurality of operational parameters to be employed by a computer system while performing the respective operational functions;

determine a first number of the plurality of operational parameters that comply with at least some target settings for the respective operational parameters, the first number being less than a predetermined threshold number of the target settings;

determine a difference number being a difference between the predetermined threshold number of the target settings and the first number of the plurality of operational parameters, the difference number of the plurality of operational parameters failing to comply with any of the target settings;

for each respective operational parameter among the difference number of the plurality of operational parameters that fail to comply with any of the target settings:

query the computer system for a current setting of the respective operational parameter on the computer system; and send, to the computer system, a command to change the current setting of the respective operational parameter on the computer system to conform with the target setting for the respective operational parameter; and monitor a plurality of current settings for the plurality of operational parameters, respectively, for compliance with the target settings to assure that plurality of operational parameters comply with at least the predetermined threshold number of the target settings.

9. The computer program product of claim 8, wherein the one or more data processing apparatus, the computer system, and a remote source are communicably coupled to one another via a network, and wherein the instructions are further operable to cause the one or more data processing apparatus to retrieve the configuration data set from the remote source.

10. The computer program product of claim 8, further including instructions operable to cause the one or more data processing apparatus to:
request an updated configuration data set from a remote source;
receive the updated configuration data set specifying a second plurality of operational parameters corresponding to the plurality of operational functions, respectively, and, for each operational parameter, a second target setting for the operational parameter, the plurality of operational parameters to be employed by the computer system while performing the respective operational functions; and
for each operational parameter of the second plurality of operational parameters:
query the computer system for a second current setting of the operational parameter on the computer system;
determine whether the second current setting of the operational parameter complies with the second target setting for the operational parameter; and
send to the computer system a second command to change the second current setting of the operational parameter.

11. The computer program product of claim 8, wherein the target setting for the operational parameter comprises a single value; and
wherein the instructions operable to cause the one or more data processing apparatus to determine whether the current setting of the operational parameter complies with the target setting for the operational parameter include instructions operable to cause the one or more data processing apparatus to determine whether the current setting of the operational parameter is equal to the single value.

12. The computer program product of claim 8, wherein the target setting for the operational parameter is a range of values; and
wherein the instructions operable to cause the one or more data processing apparatus to determine whether the current setting of the operational parameter complies with the target setting for the operational parameter include instructions operable to cause the one or more data processing apparatus to determine whether the current setting of the operational parameter is within the range of values.

13. The computer program product of claim 8, further including instructions operable to cause the one or more data processing apparatus to select the configuration data set from a plurality of configuration data sets based on one or more computer system deployment characteristics.

14. The computer program product of claim 8, further including instructions operable to cause the one or more data processing apparatus to provide display data indicating whether the current setting of the operational parameter complies with the target setting for the operational parameter.

15. The method of claim 1 wherein the receiving of the configuration data set includes receiving, at the processor, the configuration data set specifying the plurality of operational parameters corresponding to the plurality of operational functions that include one or more of establishing an NFS connection, and establishing an HBA connection.

16. A server communicably coupled to a computer system, the computer system being operative to perform a plurality of operational functions, the server comprising:
at least one processor operative to execute at least one computer program out of at least one memory to:
receive a configuration data set specifying a plurality of operational parameters corresponding to the plurality of operational functions, respectively, and, for each operational parameter, a target setting for the operational parameter, the plurality of operational parameters including one or more of a Network File System (NFS) timeout, a Host Bus Adapter (HBA) timeout, one or more specified NFS settings, one or more specified Internet Small Computer Systems Interface (iSCSI) settings, and one or more specified multi-path network settings, the plurality of operational parameters to be employed by the computer system while performing the respective operational functions;
determine a first number of the plurality of operational parameters that comply with at least some target settings for the respective operational parameters, the first number being less than a predetermined threshold number of the target settings;
determine a difference number being a difference between the predetermined threshold number of the target settings and the first number of the plurality of operational parameters, the difference number of the plurality of operational parameters failing to comply with any of the target settings;
for each respective operational parameter among the difference number of the plurality of operational parameters that fail to comply with any of the target settings:
query the computer system for a current setting of the respective operational parameter on the computer system; and
send to the computer system a command to change the current setting of the respective operational parameter on the computer system to conform with the target setting for the respective operational parameter; and
monitor a plurality of current settings for the plurality of operational parameters, respectively, for compliance with the target settings to assure that the plurality of operational parameters comply with at least the predetermined threshold number of the target settings.

17. The server of claim 16, wherein the server, the computer system, and a remote source are communicably coupled to one another via a network, and wherein the at least one processor is further operative to execute the at least one computer program out of the at least one memory to retrieve, over the network, the configuration data set from the remote source.

18. The server of claim 16, wherein the at least one processor is further operative to execute the at least one computer program out of the at least one memory to:
request an updated configuration data set from a remote source;

receive the updated configuration data set specifying a second plurality of operational parameters corresponding to the plurality of operational functions, respectively, and, for each operational parameter, a second target setting for the operational parameter, the second plurality of operational parameters to be employed by the computer system while performing the respective operational functions; and for each operational parameter of the second plurality of operational parameters:

query the computer system for a second current setting of the operational parameter on the computer system;

determine whether the second current setting of the operational parameter complies with the second target setting for the operational parameter; and send to the computer system a second command to change the second current setting of the operational parameter on the computer system to conform with the second target setting for the operational parameter.

19. The server of claim 16, wherein the target setting for the operational parameter comprises a single value; and wherein the at least one processor is further operative to execute the at least one computer program out of the at least one memory to determine whether the current setting of the operational parameter complies with the target setting for the operational parameter by determining whether the current setting of the operational parameter is equal to the single value.

20. The server of claim 16, wherein the target setting for the operational parameter is a range of values; and wherein the at least one processor is further operative to execute the at least one computer program out of the at least one memory to determine whether the current setting of the operational parameter complies with the target setting for the operational parameter by determining whether the current setting of the operational parameter is within the range of values.

21. The server of claim 16, wherein the at least one processor is further operative to execute the at least one computer program out of the at least one memory to provide display data indicating whether the current setting of the operational parameter complies with the target setting for the operational parameter.

* * * * *